(12) United States Patent
Hashimoto et al.

(10) Patent No.: US 7,330,774 B2
(45) Date of Patent: Feb. 12, 2008

(54) RECEPTION SYSTEM

(75) Inventors: Sachie Hashimoto, Wako (JP); Kimio Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/636,464

(22) Filed: Dec. 11, 2006

(65) Prior Publication Data
US 2007/0135119 A1   Jun. 14, 2007

(30) Foreign Application Priority Data
Dec. 12, 2005   (JP)   ............................. 2005-358352

(51) Int. Cl.
*G06F 19/00*   (2006.01)

(52) U.S. Cl. ................. 700/245; 700/246; 700/247; 700/248; 700/249; 700/250; 700/251; 700/252; 700/253; 700/254; 700/255; 318/568.11; 318/568.12; 318/568.13; 318/568.14; 318/568.16; 219/121.61; 219/121.62; 219/121.64; 219/125.11; 219/125.12; 901/2; 901/8; 901/9; 901/16; 901/23

(58) Field of Classification Search ............... 700/245, 700/246, 247, 248, 249, 250, 251, 252, 253, 700/254, 255, 256, 257, 258, 259; 318/568.11, 318/568.12, 568.13, 568.14, 568.15, 568.16, 318/568.17; 901/2, 8, 9
See application file for complete search history.

(56) References Cited

U.S. PATENT DOCUMENTS

| 6,584,376 | B1* | 6/2003 | Van Kommer ............... 700/245 |
| 7,047,105 | B2* | 5/2006 | Kakutani et al. ............ 700/245 |
| 7,218,993 | B2* | 5/2007 | Yasukawa et al. .......... 700/264 |
| 7,228,203 | B2* | 6/2007 | Koselka et al. ............. 700/246 |
| 7,269,480 | B2* | 9/2007 | Hashimoto et al. ......... 700/245 |

FOREIGN PATENT DOCUMENTS

| JP | 2004-114178 | 4/2004 |
| JP | 2004-299026 | 10/2004 |

* cited by examiner

*Primary Examiner*—Thomas Black
*Assistant Examiner*—Marc McDieunel
(74) *Attorney, Agent, or Firm*—Squire, Sanders & Dempsey L.L.P.

(57) ABSTRACT

An operation control unit of a reception system includes a visitor ID information DB for storing therein visitor comparison information and visitor ID information including a phone number of a receiver of a visitor; an identifying unit for identifying the visitor when visitor information obtained by a camera or the like of the robot is identical to the visitor comparison information; a phone calling module for calling the phone number of a mobile terminal of the receiver via a phone network, when the visitor is identified; an informing content determining unit for determining an informing content to the receiver based on the visitor ID information, when the visitor is identified; and a speech generating part for converting the received information into a voice. The informing content is sent to the mobile terminal of the receiver via the phone network.

15 Claims, 9 Drawing Sheets

RECEPTION SYSTEM

CROSS REFERENCE TO RELATED APPLICATIONS

This application claims the benefit of Japanese Patent Application No. 2005-358352 filed on Dec. 12, 2005, the disclosure of which is incorporated herein by reference.

BACKGROUND OF THE INVENTION

1. Field of the Invention

The present invention relates to a reception system including a robot attending to a visitor and an operation control unit for controlling operations of the robot.

2. Description of the Related Art

In receiving a visitor to a company or the like, a receptionist typically attends to a visitor, and informs a receiver of the visitor by phone that the visitor has come. There have been disclosed techniques that, instead of a receptionist, an autonomous moving robot attends to a visitor (see Japanese Published Patent Application No. 2004-299026, paragraph 0069, FIG. 1, and Japanese Published Patent Application No. 2004-114178, paragraph 0020, FIG. 1).

In the techniques, the robot can recognize the name of a visitor based on image data captured by a camera provided on the robot or at a reception, and on data concerning visitors stored in a database in a server or the like. Then the robot can take the visitor to a predetermined place (a sofa or a meeting room). In the techniques, the robot can inform the receiver via a personal computer or by phone that the visitor has come, while the robot is taking the visitor to the predetermined place, after the robot recognizes the visitor.

In the conventional technology, however, to inform the receiver of the visitor's arrival by phone is merely in a conceptual stage, and specific procedures to inform the receiver by phone has not yet been developed. In addition to this, there are other problems as follows:

(1) If a robot can inform a receiver by phone of a visitor's arrival only in predetermined patterns of sentences, the receiver himself/herself has to obtain necessary information that cannot be obtained from the sentences. More specifically in a case where, for example, what a robot can inform the receiver by phone is only such a sentence as "Your visitor has come.", and, when the receiver forgets the name of the visitor or which meeting room is to receive the visitor, the receiver has to take the time to check his/her schedule book or the like for confirmation. That is, there is a need to develop a reception system in which a robot can inform a receiver by phone of contents appropriately responding to different situations;

(2) If the receiver cannot hear or understand what the robot has said on the phone, and the robot simply disconnects the phone, the receiver cannot appropriately attend to the visitor. More specifically, for example, in a case where the robot informs the receiver of the number and the kind of drinks for a visitor(s), and, even when the receiver cannot understand what the robot has said on the phone, the robot may simply disconnect the phone. Thus the receiver has to take the time to go to the visitor and confirm the number and the kind of drinks, resulting in a delay in serving the drinks; and (3) The robot may fail to inform the receiver of the visitor's arrival by phone. For example, when the robot calls up the receiver, the receiver may be away from the desk. In such a case, how to take a suitable measure is not provided in the conventional technology.

In the light of the problems described above, it would be desirable to provide a reception system in which a robot suitably informs a receiver of the visitor's arrival.

SUMMARY OF THE INVENTION

According to a first aspect of the present invention, a reception system including an autonomously operating robot; and an operation control unit for controlling operations of the robot is provided. The robot or the operation control unit includes a detecting unit for detecting a visitor and obtaining information on the visitor; a storage unit for storing at least visitor related information including visitor comparison information prepared in advance which is to be compared with the visitor information obtained by the detecting unit, and a phone number of a receiver to receive the visitor; an identifying unit for identifying the visitor, based on a comparison between the visitor information obtained by the detecting unit and the visitor comparison information stored in the storage unit; a phone calling unit for making a call via a phone network to a phone of the receiver using the phone number in the visitor related information, when the identifying unit identifies the visitor; and an informing content determining unit for determining an informing content to be informed to the receiver based on the visitor related information, when the identifying unit identifies the visitor. The informing content determined by the informing content determining unit is transmitted via the phone network to the phone of the receiver which is confirmed to be connected according to a call by the phone calling unit.

In the first aspect of the present invention, the detecting unit detects the visitor, and outputs the visitor information obtained by the detection to the identifying unit. The identifying unit compares the visitor information outputted by the detecting unit with the visitor comparison information prepared in advance and read from the storage unit. If the visitor information is identical to the visitor comparison information, the visitor is identified. Then the identifying unit outputs the phone number of the receiver of the identified visitor, to the phone calling unit, and also outputs the visitor related information related to the identified visitor to the informing content determining unit.

When the identifying unit outputs the phone number and the visitor related information to the phone calling unit and the informing content determining unit, respectively, the phone calling unit make a call to the phone of the receiver, and the informing content determining unit determines a content to be informed to the receiver. Specifically, for example, when the name of the visitor is stored in the storage unit as the visitor related information, the informing content is determined as "Mr./Ms. XX has come". When the receiver connects the phone in response to the call by the phone calling unit described above, the informing content determined by the informing content determining unit is sent to the receiver via the phone network and the phone.

According to a second aspect of the present invention, in the reception system according to the first aspect, a voice synthesizing unit and the phone calling unit are provided in the operation control unit.

In the second aspect of the present invention, the voice synthesizing unit for converting a content to be informed to the receiver into a speech is provided, and the voice synthesizing unit and the phone calling unit each provided in the operation control unit conduct a phone informing from the reception system to the receiver. Thus, it is not necessary to mount components of the voice synthesizing unit and the phone calling unit into the robot, to thereby give the robot a better appearance and less weight. It is to be noted that, even though the voice synthesizing unit is provided in the robot as in the conventional case, the robot has the advantages described above since the components of the phone calling unit are not assembled in the robot.

According to a third aspect of the present invention, in the reception system according to the first or second aspect, the robot or the operation control unit further includes a question content storage unit for storing a content of a question to be asked to the visitor. The robot further includes an informing unit for informing the visitor of the question content stored in the question content storage unit; and a reply recognition unit for recognizing a reply from the visitor in response to the question content. The reply recognized by the reply recognition unit is sent to the receiver via the phone network and the phone.

In the third aspect of the present invention, when the detecting unit detects the visitor, the informing unit provided in the robot reads out a question content from the question content storage unit, and informs the visitor of the question content. Specifically, if a question for the visitor stored in the question content storage unit is about which drink to choose, the informing unit informs the visitor of the question content in a form of speech or word display, such as "What would you like to drink?". When the visitor replies to the question content, and the reply recognition unit recognizes the reply (for example, "a coffee"), the recognized reply is sent to the receiver via the voice synthesizing unit, the phone network and the phone.

According to a fourth aspect of the present invention, in the reception system according to any one of the first to third aspects, the robot or the operation control unit further includes a call error detecting unit for determining whether a call made by the phone calling unit has failed or not based on whether the call error detecting unit receives a predetermined error signal or not and outputting an error informing signal when the call is determined to have failed; and an operator informing unit for informing the operator of the failed call based on the error informing signal. The operator informing unit informs the operator of the failed call using, for example, a phone or a PC.

According to a fifth aspect of the present invention, in the reception system according to the fourth aspect, the error signal indicates that the phone of the receiver is busy, powered off, or out of a service area.

In the fifth aspect of the present invention, for example, if the phone calling unit makes a call to the phone of the receiver when the phone is busy, a given machine constituting the phone network (for example, a subscriber line phone switch, a transit switch, or the like) determines that the phone is unconnectable, and sends a call-receiving error signal indicating that the phone is unconnectable, to the call error unit. When the call error detecting unit receives the call-receiving error signal, the call error detecting unit determines that the call made by the phone calling unit has failed. Then the call error detecting unit outputs an error informing signal indicating that the call made by the phone calling unit has failed, to the operator informing unit, which then informs the operator of the failed call using, for example, a phone or a PC.

According to a sixth aspect of the present invention, in the reception system according to the fourth or fifth aspect, the error signal is an unmatched signal indicating that the phone number called by the phone calling unit is different from the phone number of the receiver.

In the sixth aspect of the present invention, for example, if the phone calling unit makes a call to the phone of the receiver which is not available due to subscription cancellation, a given machine constituting the phone network (for example, a subscriber line phone switch, a transit switch, or the like) determines that the phone is unconnectable, and sends an unmatched signal indicating that the phone is unconnectable, to the call error unit. When the call error detecting unit receives the unmatched signal, the call error detecting unit determines that the call made by the phone calling unit has failed. Then the call error detecting unit outputs an error informing signal indicating that the call made by the phone calling unit has failed, to the operator informing unit, which then informs the operator of the failed call using, for example, a phone or a PC.

According to a seventh aspect of the present invention, in the reception system according to any one of the first to third aspects, the robot or the operation control unit further includes a call error detecting unit for determining that a call made by the phone calling unit has failed, if a predetermined period of time elapses after the phone calling unit makes a call, and for outputting an error informing signal when the call is determined to have failed; and an operator informing unit for informing an operator of the failed call based on the error informing signal.

The expression "a predetermined period of time elapses" herein does not intend to limit the processing by the call error detecting unit, and the period of time is determined as a consequence of arbitrary selection. For example, whether or not the predetermined period of time has elapsed may be determined by simply timing using a clock, or by counting a predetermined number of beep-data reception.

In the seventh aspect of the present invention, after the phone calling unit makes a call for a predetermined period of time, the call error detecting unit determines that the call made by the phone calling unit has failed. Then the call error detecting unit outputs an error informing signal indicating that the call made by the phone calling unit has failed, to the operator informing unit. The operator informing unit informs the operator of the failed call using, for example, a phone or a PC.

According to an eighth aspect of the present invention, in the reception system according to any one of the fourth to seventh aspects, after the call error detecting unit determines that the call has failed, the call error detecting unit determines whether a number of the failed calls is less than a predetermined number or not. If the call error detecting unit determines that the number of the failed calls is less than the predetermined number, the call error detecting unit makes the phone calling unit retry a call. If the call-error detecting unit determines that the number of the failed calls is not less than the predetermined number, the call error detecting unit outputs an error informing signal to the operator informing unit.

According to a ninth aspect of the present invention, in the reception system according to any one of the first to third aspects, the robot or the operation control unit includes a call-receiving error detecting unit for determining whether a call-receiving by the receiver has failed or not by determining whether a call-receiving termination signal indicating that a state of the call-receiving has terminated is received or not, before a transmission time elapses which is necessary for transmitted information described hereinafter to be conveyed to the receiver via the voice synthesizing unit, the phone network, and the phone; and an operator informing unit for informing an operator that a call-receiving has failed when the call-receiving error detecting unit determines the failed call.

The expression "transmitted information" used herein means information transmitted to the receiver such as an "informing content" determined by the informing content determining unit and the "reply" recognized by the reply recognition unit. The expression "when a state of the call-receiving has terminated" includes when the receiver disconnects the phone and when the phone of the receiver goes out of a service area during receiving a call.

In the ninth aspect of the present invention, for example, when the receiver disconnects the phone, the phone of the receiver sends a call-receiving termination signal. If the call-receiving error detecting unit receives the call-receiving termination signal before a passage of a necessary transmission time, the call-receiving error detecting unit determines that the call-receiving by the receiver has failed, and outputs a signal indicating the failed call-receiving to the operator informing unit. The operator informing unit informs the operator of the failed call-receiving using, for example, a phone and a PC.

According to a tenth aspect of the present invention, in the reception system according to any one of the first to ninth aspects, the robot or the operation control unit further includes a confirming unit for sending confirming information, together with the transmitted information, to the receiver via the voice synthesizing unit, the phone network, and the phone, the confirming information asking the receiver whether or not the receiver has confirmed the transmitted information; and a resending unit for determining whether the receiver has confirmed the transmitted information or not based on a reply signal replied by the receiver in response to the confirming information, for terminating a connected state of the phone when the receiver is determined to have already confirmed the transmitted information, and for resending the transmitted information and the confirming information when the receiver is determined not yet to have confirmed the transmitted information.

The expression "a reply signal" herein means a push sound of a push button, an electronic signal, or a voice made by the receiver.

In the tenth aspect of the present invention, when the transmitted information (for example, "a coffee" as the information on a drink of the visitor's choice) is sent to the receiver, in addition to this transmitted information, the confirming information is also sent by the confirming unit (for example, "If you have confirmed the content, press the push button 1. If you would like to confirm the content again, press the push button 2") to the receiver via the voice synthesizing unit, the phone network, and the phone. When the receiver sends a reply signal in response to the confirming information (for example, the receiver presses the push button 1 or 2), the resending unit determines whether the receiver has confirmed the transmitted information or not, based on the reply signal. If the resending unit determines that the receiver has confirmed the transmitted information, the resending unit terminates a state of a call-receiving by the receiver. If the resending unit determines that the receiver has not yet confirmed the transmitted information, the resending unit resends the transmitted information and the confirming information to the receiver.

Other features and advantages of the present invention will become more apparent from the following detailed description of the invention, when taken in conjunction with the accompanying exemplary drawings.

DETAILED DESCRIPTION OF THE EXEMPLARY EMBODIMENT

First Embodiment

A first embodiment of a reception system according to the present invention is described next with reference to the drawings. In the description, an example is assumed in which a humanoid robot that can autonomously walk on two legs attends to a visitor who has come to a lobby in an office building.

Figure 1:
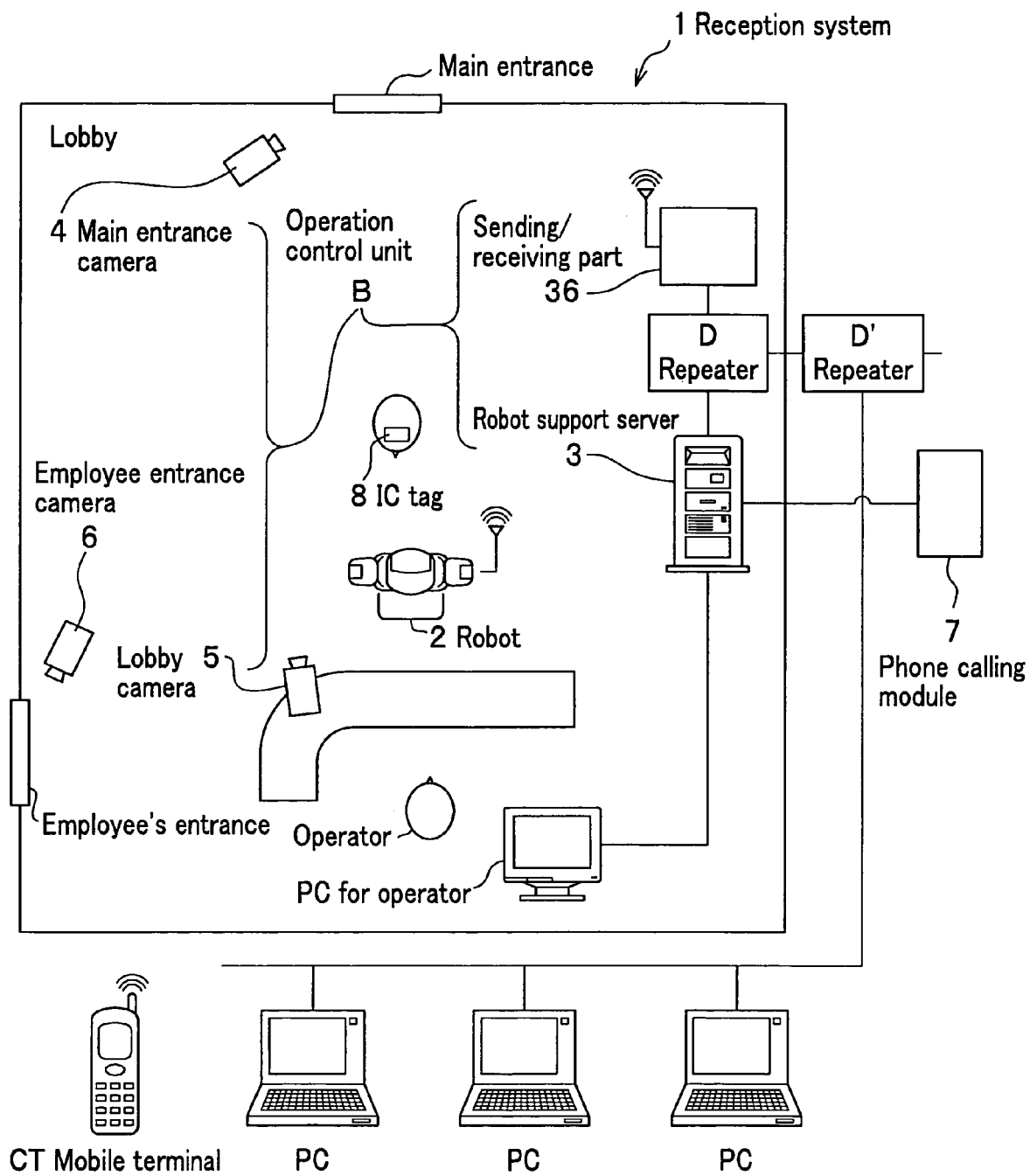
FIG. 1 is a schematic view showing a reception system according to a first embodiment.

As shown in FIG. 1, a reception system 1 includes a robot 2 and an operation control unit B. The operation control unit B includes a robot support server 3, a phone calling module (a phone calling unit) 7, a sending/receiving part 36, a main entrance camera 4, a lobby camera 5, and an employee entrance camera 6. Each of the robot support server 3 and the sending/receiving part 36 is connected via repeaters D, D' to PC by LAN. FIG. 1 shows a configuration in which the robot support server 3 is set up in the lobby, however, the robot support server 3 may be set up in any other room.

Figure 2:
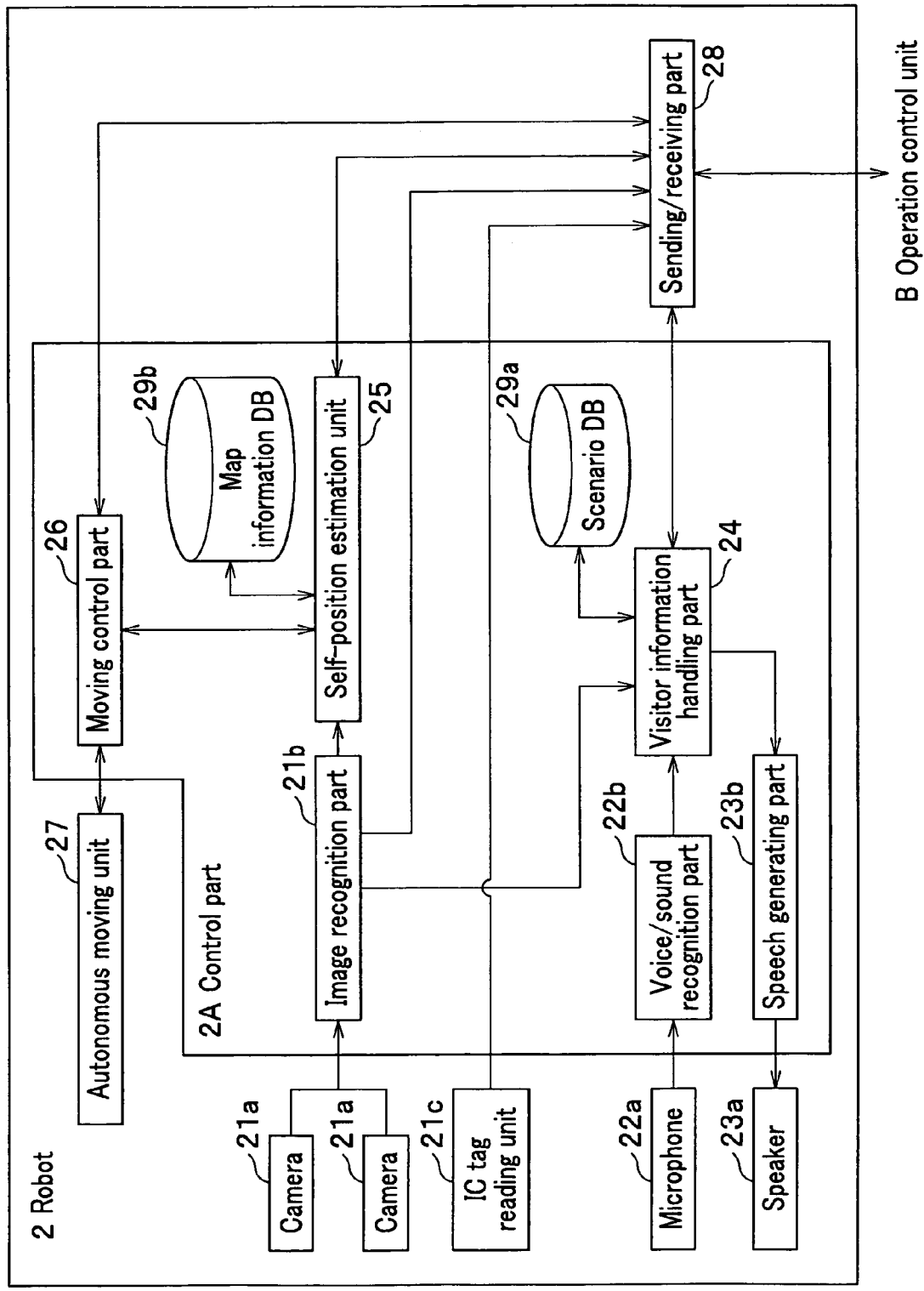
FIG. 2 is a block diagram showing a robot of the reception system according to the first embodiment.

Next is described the robot 2. The robot 2 can autonomously walk on two legs, and, as shown in FIG. 2, includes cameras (detecting unit) 21a, 21a, an IC tag reading unit (a detecting unit) 21c, a microphone 22a, a speaker 23a, a control part 2A, an autonomous moving unit 27, and a sending/receiving part 28. The control part 2A includes an image recognition part (a detecting unit) 21b, a voice/sound recognition part 22b, a speech generating part (a voice synthesis unit) 23b, a visitor information handling part 24, a self-position estimation unit 25, a moving control part 26, a scenario DB (database) 29a, and a map information DB 29b.

The camera 21a captures image information (visitor information) such as a surrounding circumstance of the robot 2 and a face of the visitor to send the image information to the image recognition part 21b. The camera 21a may be a monochrome or color camera, and may be monocular or binocular (in FIG. 2, binocular). The camera 21a is driven by a motor not shown for a panning movement (in a horizontal direction) or a tilting movement (in a vertical direction), and can face a desired direction.

The image recognition part 21b digitally receives the image information captured by the camera 21a. The image recognition part 21b automatically extracts and tracks a moving body with the Active Contour Model (also called as Snakes) or the like, and can detect position information of the visitor. The image recognition part 21b sends the digitalized image information to the visitor information handling part 24, the self-position estimation unit 25, and the sending/receiving part 28.

If the visitor has an IC tag 8 (see FIG. 1), the IC tag reading unit 21c reads out (obtains) a serial number as the visitor information from the IC tag 8. The IC tag reading unit 21c sends the read visitor information to the sending/receiving part 28. In this embodiment, only the serial number is obtained, because the serial number in the IC tag 8 is sufficient as key data to draw visitor ID information (an ID number, a name, a business title, and a company's name of the visitor, and a phone number of a mobile terminal CT of the receiver) from a visitor ID information DB 35b which will be described below. However, the present invention is not limited to this configuration, and can be applied to the configuration in which information other than the serial number is read out from the IC tag 8.

The microphone 22a collects voice/sound information such as an ambient sound and a speech of the visitor, and sends the voice/sound information to the voice/sound recognition part 22b.

The voice/sound recognition part 22b locates a source of a voice/sound based on voice/sound information collected by the microphone 22a. Further the voice/sound recognition part 22b references vocabulary registered in advance to recognize a content of a speech of the visitor.

The speaker 23a outputs a speech generated by the speech generating part 23b to communicate with the visitor.

The speech generating part 23b synthesizes a speech representing a content to be transmitted to the visitor to output the speech to the speaker 23, based on a scenario for communications stored in the scenario DB 29a and sent from the visitor information handling part 24, or an instruction of guide operations by a guide operation instructing unit 33 to be hereinafter described (see FIG. 3).

The visitor information handling part 24 generates a speech and controls operations of the robot 2 (such as lifting an arm thereof), based on various information sent from the robot support server 3, the image information sent from the image recognition part 21b, and a speech of the visitor through the microphone 22a, or the like. When the robot 3 recognizes the visitor and starts a guide operation, the visitor information handling part 24 sends guide start information through the sending/receiving part 28 thereof to the sending/receiving part 36 the robot support server 3. In addition, when the guide operation for the visitor is completed, the visitor information handling part 24 makes the sending/receiving part 28 send guide completion information to the sending/receiving part 36 on the side of the robot support server 3.

The self-position estimation unit 25 estimates a current position of the robot 2, based on the image information sent from the image recognition part 21b, and map information stored in the map information DB 29b.

The moving control part 26 controls operations of the autonomous moving unit 27, based on the current position of the robot 2, the map information stored in the map information DB 29b, and information on guide operations sent from the robot support server 3.

The autonomous moving unit 27 is a unit allowing the robot 2 to move autonomously, and corresponds to the legs of the robot 2 in this embodiment.

The sending/receiving part 28 is a unit for sending and receiving data to and from the robot support server 3 by wireless.

The scenario DB 29a is a database for supporting communication with a visitor. The scenario DB 29a stores therein sentences or the like to be used in a conversation with a visitor, such as "May I have your name, please?" and "Are you Mr./Ms. XX?".

The map information DB 29b is a database for storing therein map information concerning an area in which the robot 2 can move around. The map information is the same as map information stored in a map information DB 35a (see FIG. 3) in the robot support server 3, and can be updated by sending and receiving necessary data to and from the robot support server 3.

Figure 3:
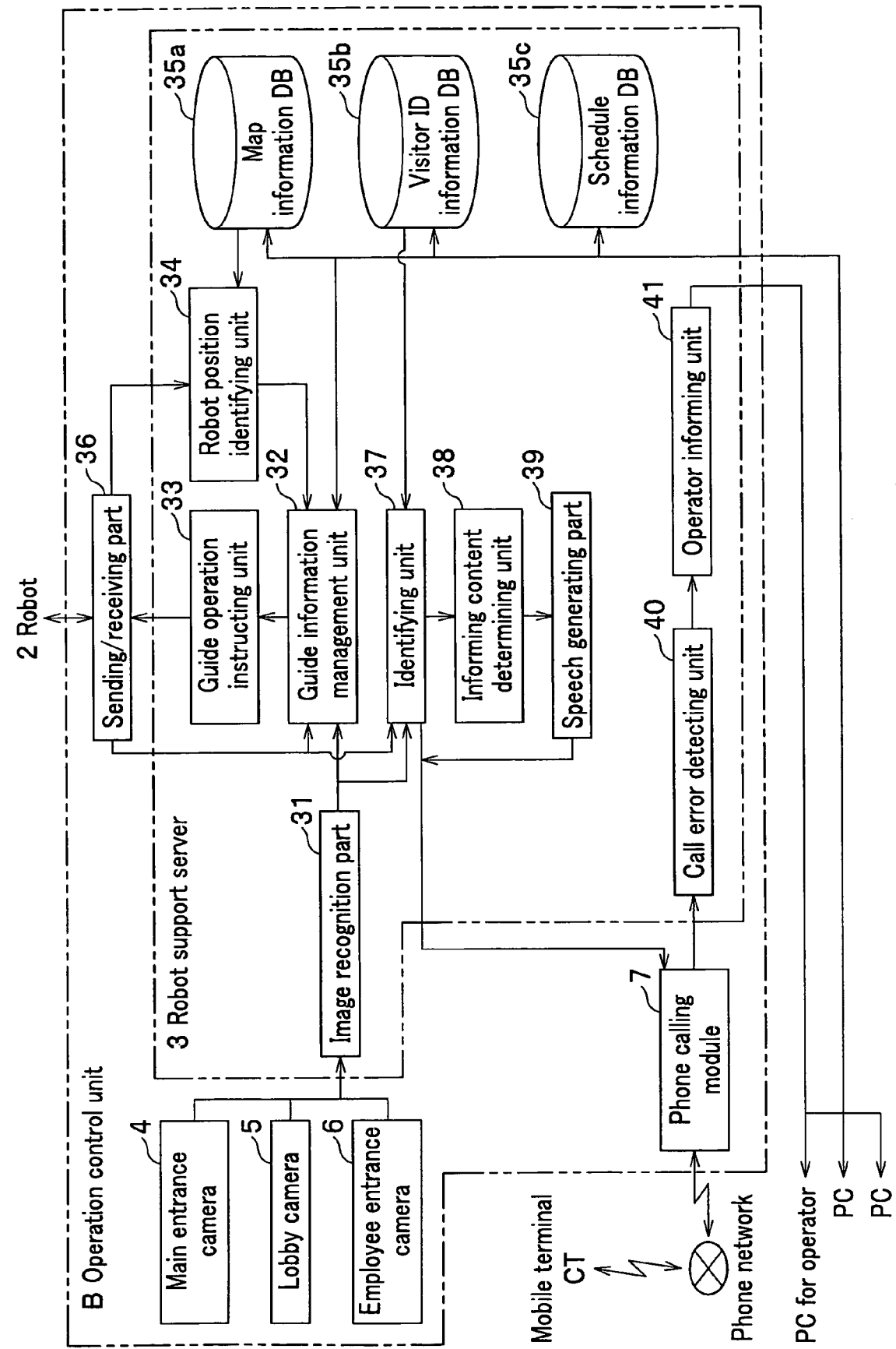
FIG. 3 is a block diagram showing an operation control unit of the reception system according to the first embodiment.

Next is described an operation control unit B with reference to FIG. 3. The operation control unit B includes the robot support server 3, the sending/receiving part 36, the main entrance camera 4, the lobby camera 5, the employee entrance camera 6, and the phone calling module (the phone calling unit) 7. The robot support server 3 includes an image recognition part 31, a guide information management unit 32, the guide operation instructing unit 33, a robot position identifying unit 34, the map information DB 35a, a visitor ID information DB (a storage unit) 35b and a schedule information DB 35c. The robot support server 3 further includes an identifying unit 37, an informing content determining unit 38, a speech generating part 39, a call error detecting unit 40, and an operator informing unit 41, which characterizes the present invention. The robot support server 3 can send and receive data to and from the robot 2 through the sending/receiving part 36.

The image recognition part 31 digitally receives image information captured by the main entrance camera 4, the lobby camera 5, and the employee entrance camera 6. Further, the image recognition part 31 automatically extracts and tracks a moving body with the Active Contour Model or the like, and can detect position information of the visitor.

Each of the cameras 4 to 6 is described next. The main entrance camera 4 captures image information at and around the main entrance, and sends the image information to the image recognition part 31. The lobby camera 5 captures image information inside the whole lobby, and sends the image information to the image recognition part 31. The employee entrance camera 6 captures image information at and around the employee entrance, and sends the image information to the image recognition part 31.

Each of the image information captured by the main entrance camera 4, the lobby camera 5, and the employee entrance camera 6 is sent to the image recognition part 31. A moving body recognized by the image recognition part 31 from the image information captured by the main entrance camera 4 of those cameras is recognized as a visitor. Then data on a time when the visitor is first recognized is sent to the guide information management unit 32 as a visit time.

In the meantime, a moving body detected based on an image captured by the employee entrance camera 6 is recognized as an employee.

It can be thus determined whether a moving body in the lobby is a visitor or an employee.

The image recognition part 31 then computes a position of a visitor or an employee based on the image information captured by the lobby camera 5 to obtain the position information of the visitor or employee.

The map information DB 35a stores therein the map information concerning an area in which the robot 2 can move around. The map information includes a location of a meeting room, a location of stairs, obstacles in the lobby such as an ornamental plant and a sofa.

The visitor ID information DB 35*b* stores therein visitor related information including the visitor ID information and visitor comparison information prepared in advance, such as a face image, and a serial number in the IC tag 8, both of the information being associated with each other. The visitor ID information DB 35*b* includes an ID number, a name, a business title, and a company's name of the visitor; and a phone number of a mobile terminal CT of a receiver. At least one of the data described above is a key to retrieving schedule information. For example, the aforementioned ID number can be used as key data.

It is to be noted that a face image is usually taken by the robot 2, and is registered with a permission of the visitor.

The schedule information DB 35*c* stores therein schedule information on a scheduled visitor and visitor ID information (for example, an ID number), which are associated with each other. The schedule information includes, for example, time and date of a scheduled visit; a name, a business title, and a company's name of the visitor, a scheduled receiver, and a place to be guided.

It is to be noted that the information stored in each of the DB 35*a* to 35*c* can be input and updated from a PC or a mobile terminal CT connected to the robot support server 3.

The guide information management unit 32 prepares and manages guide information for the visitor using a known technique, based on the information stored in the map information DB 35*a*, the visitor ID information DB 35*b*, and the schedule information DB 35*c*, as well as the image information sent from the image recognition part 31. The guide information management unit 32 then sends the guide information to the guide operation instructing unit 33.

The guide operation instructing unit 33 prepares guide operations based on the guide information managed by the guide operation management unit 32. When there are a plurality of visitors not yet guided in the lobby, an order of guiding is prepared using a known technique, and the visitors are guided according to the order of guiding. The prepared guide operations are sent from the sending/receiving part 36 to the robot 2.

The robot position identifying unit 34 identifies a current position of the robot 2, based on the image information digitally obtained in the image recognition part 21*b* (see FIG. 2), and the map information stored in the map information DB 35*a*.

The sending/receiving part 36 sends and receives data to and from the sending/receiving part 28 (see FIG. 2) of the robot 2 by wireless. When the sending/receiving part 36 receives data from the robot 2, the sending/receiving part 36 sends the data to the identifying unit 37, the guide information management unit 32, and the robot position identifying unit 34. In particular, the sending/receiving part 36 sends the visitor information (a face image or a serial number) sent from the image recognition part 21*b* or the IC tag reading unit 21*c* via the sending/receiving part 28 of the robot 2.

Next are described the identifying unit 37, the informing content determining unit 38, the speech generating part 39 (the voice synthesis unit), the phone calling module 7, the call error detecting unit 40, and the operator informing unit the operator informing means 41, which characterizes the present invention.

The identifying unit 37 has a function of determining whether or not the visitor information (a face image) and position information sent from the image recognition part 21*b* of the robot support server 3 via the sending/receiving parts 28, 36, as well as the visitor information (a face image) and position information sent from the image recognition part 31 of the robot support server 3 are identical, respectively, when the identifying unit 37 receives the former visitor information and position information and the latter visitor information and position information. If the former and the latter are identical, the identifying unit 37 then determines whether or not the above-mentioned visitor information (the face image) and the visitor information (a serial number) sent from the IC tag reading unit 21*c* of the robot 2 via the sending/receiving parts 28, 36 are identical to corresponding data in the visitor comparison information (the face image or the serial number) stored in the visitor ID information DB 35*b*. Further, if the visitor information is identical to the corresponding data in the visitor comparison information, the identifying unit 37 obtains the visitor ID information (the name, the phone number, or the like of the visitor) from the visitor ID information DB 35*b* using the visitor comparison information as key information, and thereby identifies the visitor. The identifying unit 37 then sends the phone number in the obtained visitor ID information to the phone calling module 7, and also sends the information other than the phone number to the informing content determining unit 38.

The informing content determining unit 38 has a function of determining an informing content based on the visitor ID information, when the informing content determining unit 38 receives the visitor ID information from the identifying unit 37. In this embodiment, it is assumed that the informing content determining unit 38 determines an informing content of "Mr./Ms. XX, XX(title) of XX Co., Ltd. has come.", based on the information on the name, title, and company's name of the visitor. After determining the informing content, the informing content determining unit 38 sends the informing content to the speech generating part 39.

The speech generating part 39 has a function of converting the informing content into voice data (synthesizes a voice), when the speech generating part 39 receives the informing content (character data) from the informing content determining unit 38. Then the speech generating part 39 sends the voice data to the phone calling module 7.

The phone calling module 7 has a function of making a call to the mobile terminal CT of the receiver with the phone number via a phone network, when the phone calling module 7 receives the phone number from the identifying unit 37. The phone network herein may have a generally-used configuration. For example, the phone network may include a subscriber line phone switch for the phone calling module 7, a transit switch, a subscriber line phone switch for the mobile terminal CT, and a signal network and a speech path network each of which connects those switches.

Further, when the phone calling module 7 receives the informing content from the speech generating part 39, the phone calling module 7 stores therein the informing content until the mobile terminal CT becomes connected. When the mobile terminal CT becomes connected, the phone calling module 7 sends the informing content to the mobile terminal CT via the phone network. Whether the mobile terminal CT is connected or not is determined depending on whether the phone calling module 7 receives a connectable signal sent from the mobile terminal CT (for example, from the subscriber line phone switch on the side of the mobile terminal CT) indicating that the phone is connected when the mobile terminal CT becomes connected. With this configuration, the phone calling module 7 sends the informing content determined by the informing content determining unit 38 to the mobile terminal CT found to be connected in response to the call made by the phone calling module 7, via the speech generating part 39, the phone calling module 7, and the phone network. It is to be noted that, after the phone calling module 7 sends all the informing content as described above, the phone calling module 7 switches the connected state of the mobile terminal CT to an unconnected state (i.e., disconnects the call).

The call error detecting unit 40 has a function of determining whether a call made by the phone calling module 7 has failed or not depending on whether the call error detecting unit 40 receives a predetermined error signal or not. The "error signal" may be a call-receiving error signal indicating that the mobile terminal CT of the receiver is busy, powered off, or out of a service area, or may be an unmatched signal indicating that the phone number called by the phone calling module 7 is different from the phone number of the mobile terminal CT of the receiver. Such a signal is sent to the call error detecting unit 40 via the phone calling module 7 from any one of the phone switches constituting the phone network described above. If the call error detecting unit 40 determines that the call made by the phone calling module 7 has failed, the call error detecting unit 40 sends an error informing signal to the operator informing unit 41.

The operator informing unit 41 has a function of informing an operator of data indicating that the call has failed, via a PC for the operator based on the error informing signal, when the operator informing unit 41 receives the error informing signal from the call error detecting unit 40. The PC for the operator inputs, displays and updates information stored in the DBs 35a to 35c, a state of guiding the visitor, a state of making a call by the phone calling module 7, or the like. The operator can check on a display of the PC thereof, for example, whether or not the call made by the phone calling module 7 has failed.

Figure 4:
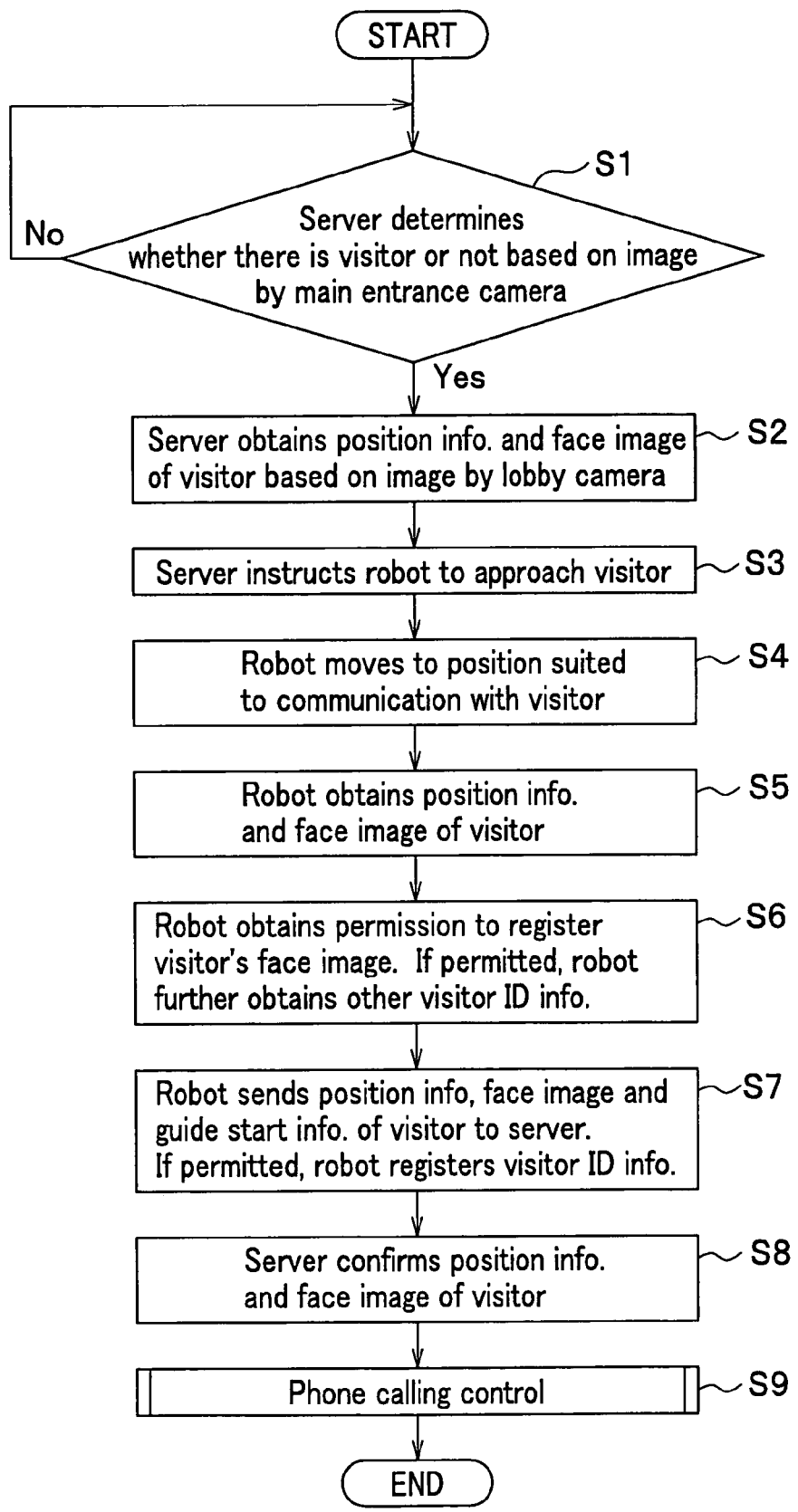
FIG. 4 is a flowchart showing operations of the reception system according to the first embodiment.

Next is described a phone informing to a receiver using the reception system 1 according to the present embodiment with reference to the flowchart of FIG. 4. It is to be noted that operations of guiding a visitor using the reception system 1 is publicly known, and the description is omitted herefrom.

(S1) Visitor Presence/Absence Determining Step

The robot support server 3 determines whether there is a visitor or not based on the image information captured by the main entrance camera 4.

(S2) Visitor Position Information Detecting Step

If a presence of a visitor is detected in Sl, the robot support server 3 detects face information and position information of the visitor based on the image information captured by the lobby camera 5.

(S3) Approach Operation Instructing Step

The robot support server 3 instructs the robot 2 to approach the visitor based on the position information of the visitor detected in S2.

(S4) Robot Moving Step

The robot 2 approaches the visitor in response to the instruction in S3, until a distance between the robot 2 and the visitor is suited to a communication therebetween.

(S5) Visitor Recognizing Step

The robot 2 captures an image of the visitor to obtain a face image and position information of the visitor. If the visitor has the IC tag 8, the robot 2 also reads out a serial number from the IC tag 8.

(S6) Face Image Register Step

The robot 2 asks the visitor whether a register of the face image is permissible or not. If the visitor permits the register, the robot 2 also asks the visitor various information such as a name, a company name, or the like, and registers the information as the visitor ID information.

(S7) Visitor Information Sending Step

The robot 2 sends the face information (or the serial number) and the position information of the visitor to the robot support server 3. Further, if the visitor permits the register of the face image, the robot 2 stores the visitor ID information including the face image in the visitor ID information DB 35b.

(S8) Visitor Confirmation Step

The robot support server 3 confirms whether the face image and the position information sent from the robot 2 are identical to the face image and the position information captured by the lobby camera 5 respectively. Namely, the robot support server 3 confirms whether or not the visitor to whom the robot support server 3 instructs the robot 2 to approach is the same person as the visitor to whom the robot 2 has actually approached.

(S9) Phone Calling Control

If it is confirmed in the visitor confirmation step S8 that the former visitor and the latter visitor are the same person, a phone calling control is started, which characterizes the present embodiment.

Figure 5:
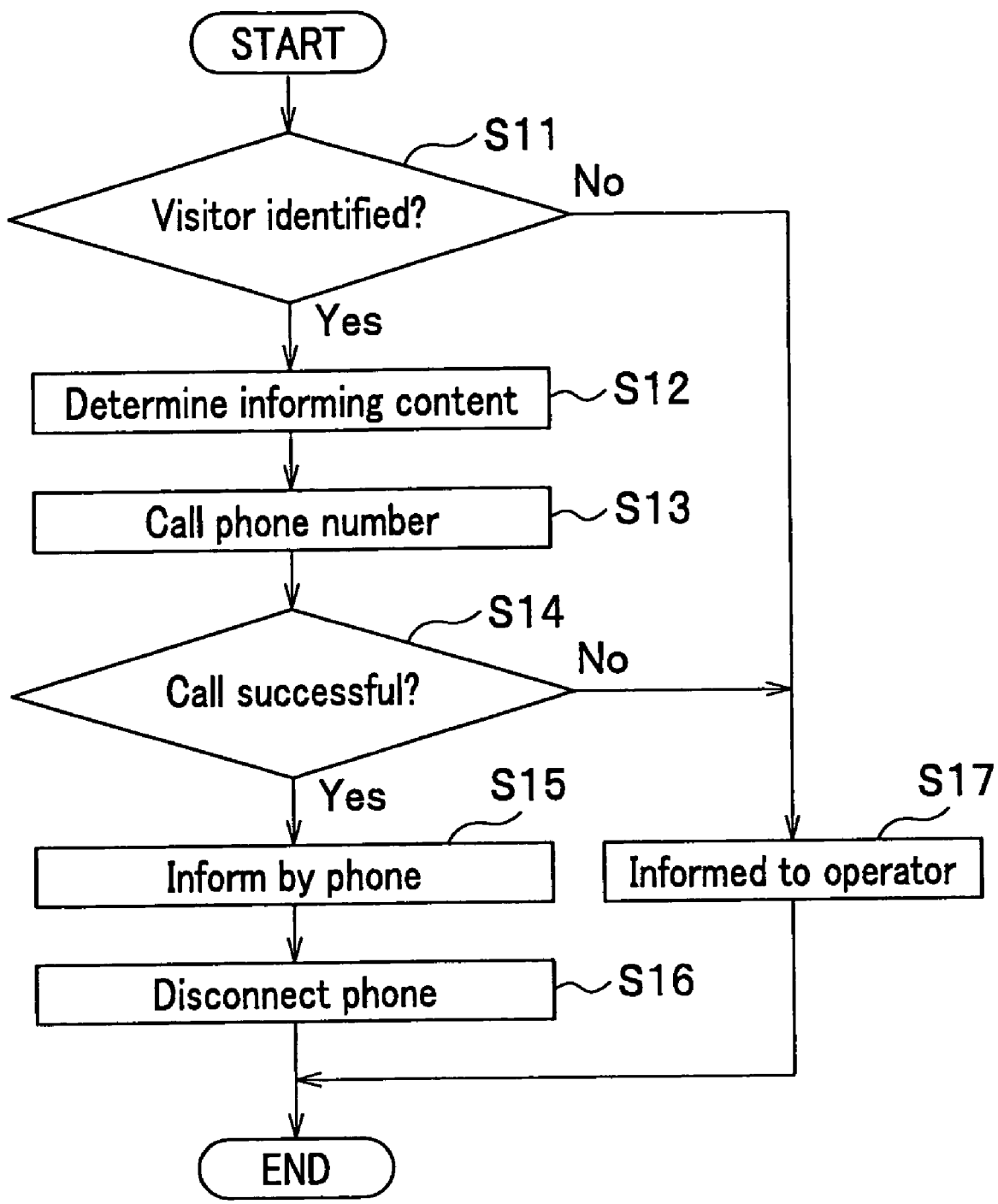
FIG. 5 is a flowchart showing a phone informing control according to the first embodiment.

Next is described in detail the phone calling control with reference to the flowchart of FIG. 5.

(S11) Visitor Identifying Step

When the phone informing control is started, it is determined in a visitor identifying step S11 whether there is the same face image (or the serial number) in the face images (or the serial numbers) stored in the visitor ID information DB 35b as that sent from the robot 2. This determines whether the visitor is identified or not. It is to be noted that, if the visitor is identified in this step S11, the visitor ID information related to the identified visitor is to be referred to in the subsequent steps.

(S12, S13) Informing Content Determining Step, Phone Number Calling Step

If it is determined in the visitor identifying step S11 that the visitor is identified (Yes), in an informing content determining step S12, the informing content to be informed to the receiver is determined based on the visitor ID information, and, in a phone number calling step S13, the phone number of the mobile terminal CT of the receiver is called. It is to be noted that the step S12 and step S13 may be in reverse order.

(S14) Call Confirming Step

After the phone number is called in the phone number calling step S13, it is confirmed whether the call has been successful or not in a phone number confirming step S14.

(S15) Phone Informing Step

When it is confirmed that the call has been successful in the step S14 (Yes), the informing content is sent to the mobile terminal CT of the receiver via the phone network in a phone informing step S15. After a predetermined time has elapsed, the call is disconnected in a phone disconnecting step S16, and the control is terminated. In the meantime, if it is confirmed that the call has failed (No) in the step S14, or that the visitor is not identified (No) in the step S11, what has been determined is informed to the operator in an operator informing step S17.

With the steps described above, the first embodiment has advantages as follows.

The informing content is determined based on the visitor ID information, which makes it possible to inform the receiver of different information (such as the name of the visitor) depending on visitors.

Further, when an error occurs that a call to the mobile terminal CT of the receiver has failed, the error can be informed to the operator by the operator informing unit 41, which makes it possible to appropriately handle the error by the operator.

The present invention can be carried out in various embodiments without being limited to the first embodiment.

In the embodiment described above, the cameras 21*a*, 21*a* of the robot 2, the image recognition part 21*b*, and the IC tag reading unit 21*c* are employed as detecting units. However, the present invention is not limited to this configuration, and the main entrance camera 4, the lobby camera 5, and the image recognition part 31 of the operation control unit B can be employed as detecting units.

In the embodiment described above, it is the robot support server 3 that is provided with the visitor ID information DB 35*b*, the identifying unit 37, the informing content determining unit 38, the speech generating part 39, the phone calling module 7, the call error detecting unit 40, and the operator informing unit 41. However, the present invention is not limited to this configuration, and it can be the robot 2 that is provided with all of the above. Nevertheless, if the robot support server 3 is provided with all of the above as in the embodiment described above, the robot 2 can be made with a better appearance and less weight.

In the embodiment described above, the informing content as voice data is stored in the phone calling module 7 until the mobile terminal CT becomes connected. However, the present invention is not limited to this configuration, and the informing content as character data can be stored in the informing content determining unit 38 until the mobile terminal CT becomes connected. In this case, however, it is necessary that the connectable signal sent from the mobile terminal CT via the phone network be sent also to the informing content determining unit 38.

In the embodiment described above, a failed call is informed to the operator via the PC for the operator. However, the present invention is not limited to this configuration, and data indicating a failed call may be sent to the mobile terminal CT of the operator via the speech generating part 39 and the phone calling module 7.

In the embodiment described above, the mobile terminal CT is used as a phone, but for example, a PHS or an ordinary fixed-line phone may be used.

In the embodiment described above, the call error detecting unit 40 is configured to determine whether a call made by the phone calling module 7 has failed or not depending on whether the call error detecting unit 40 receives a predetermined error signal or not. However, the present invention is not limited to this configuration. For example, the call error detecting unit 40 can be configured to determine whether a predetermined period time has elapsed or not after a call made by the phone calling module 7, and, if a predetermined period of time has elapsed, to determine that the call made by the phone calling module 7 has failed. With this configuration, even if the call is not received by the receiver because the receiver goes out of his/her office without the mobile terminal CT, the operator can appropriately deal with the call.

In the embodiment described above, when the call error detecting unit 40 determines that a call has failed, the call error detecting unit 40 is configured to immediately inform the operator of the failed call via the operator informing unit 41. However, the present invention is not limited to this configuration. The call error detecting unit 40 may be configured, for example, after the call error detecting unit 40 determines that the call has failed, to determine whether the number of the failed calls is less than a predetermined number or not. When the number of the failed calls is less than the predetermined number, the call error detecting unit 40 makes the phone calling module 7 retry a call. When the number of the failed calls is not less than the predetermined number, the call error detecting unit 40 outputs an error informing signal to the operator informing unit 41.

With this configuration, for example, when the phone of the receiver is busy, and the "predetermined number" of failed calls to be referred for determination by the call error detecting unit 40 is set to two, the call error detecting unit 40 first determines that the telephone is busy, and increments the number of the failed calls from zero to one, and determines whether or not the current number of failed calls (one) is less than the predetermined number (two). Then the call error detecting unit 40 error detecting unit 40 determines that the number of the failed calls is less than the predetermined number, and makes the phone calling module 7 retry a call. If the phone of the receiver is still busy after the retried call, the call error detecting unit 40 determines that the call has failed again, increments the number of failed calls from one to two, and determines whether the current number of the failed calls (two) is less than the predetermined number (two) or not. Then the call error detecting unit 40 determines that the number of the failed calls is not less than the predetermined number, and outputs an error informing signal to the operator informing unit 41. When the call error detecting unit 40 is configured as described above, an error of failed calls is informed to the operator only after the calls are made a predetermined number of times. Thus, when an error may be recoverable relatively quickly (for example, when the phone is busy), a phone informing from the system to the receiver can be performed smoothly without bothering the operator, which can reduce a workload of the operator.

The visitor ID information may include not only a name, a business title, and a company's name of the visitor but also a drink to be served, if a drink of the visitor's choice is known in advance. Additionally, if the information on drinks is stored in advance, a configuration can be designed so that the information only on drinks is sent to an external contractor for beverage service or the like, and the other information to a receiver.

Second Embodiment

Figure 6:
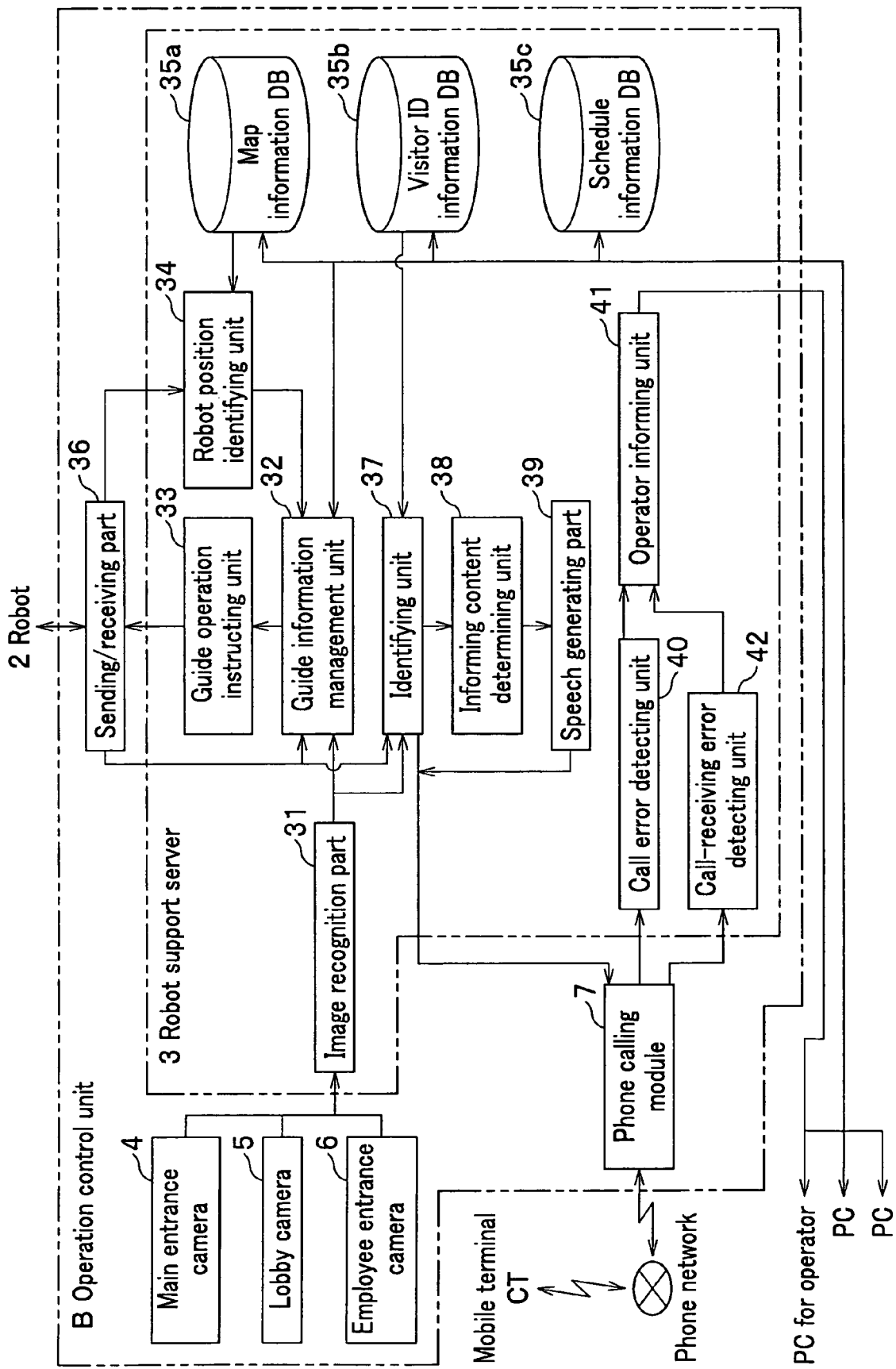
FIG. 6 is a block diagram showing an operation control unit of a reception system according to a second embodiment.

Next is described a second embodiment of the reception system according to the present invention. A configuration of this embodiment is the same as that of the first embodiment except partial changes, so that the same reference numerals are assigned to the same components as those in the first embodiment, and duplicate descriptions are omitted herefrom. FIG. 6 to be referred to herein is a block diagram showing an operation control unit of the reception system according to the second embodiment.

The configuration of the robot 2 according to the second embodiment is the same as that according to the first embodiment shown in FIG. 2, however, some operations and functions thereof are different from those according to the first embodiment. More specifically, a scenario DB 29a stores therein, unlike that in the first embodiment, a content of questions to ask a visitor. Further, when a camera 21a and an image recognition part 21b of the robot 2 detect a visitor, the image recognition part 21b sends a detecting signal to a visitor information handling part 24. When the visitor information handling part 24 receives the detecting signal, the visitor information handling part 24 draws a suitable question from the scenario DB 29a to ask the same to the visitor via a speech generating part 23b and a speaker 23a. In this embodiment, it is assumed that a case where the question is set to "What would you like to drink?". It is to be noted that the visitor information handling part 24 can be configured to greet the visitor such as "Good morning." before asking the above question.

When the visitor replies to the question, the reply (voice data) is recognized as reply data (character data) by a microphone 22a and a voice/sound recognition part 22b. In the embodiment, it is assumed that a content of the reply is "a coffee". The recognized reply data is sent to a robot support server 3 via the visitor information handling part 24 and a sending/receiving part 28, and is further sent to a phone calling module 7 of the robot support server 3 via the sending/receiving part 36, an identifying unit 37, the informing content determining unit 38, and the speech generating part 39. It is to be noted that the above reply data "a coffee" can be translated into data of "Please make a coffee." by the visitor information handling part 24, and this embodiment assumes this case. Additionally, the content of a reply according to this embodiment is added to an informing content according to the first embodiment, and is sent to a mobile terminal CT of a receiver via a phone network.

It is to be noted that the scenario DB 29a according to this embodiment may be also referred to as a question content storage unit. The visitor information handling part 24, the speech generating part 23b, and a speaker 23a according to this embodiment may be also referred to as an informing unit. The microphone 22a and the voice/sound recognition part 22b according to this embodiment may be also referred to as a reply recognition unit.

As shown in FIG. 6, the robot support server 3 according to the second embodiment is the same as that according to the first embodiment, except that the robot support server 3 according to the second embodiment is further provided with a call-receiving error detecting unit 42.

Before a passage of a predetermined period of time necessary for transmitted information (an informing content and a reply content) to be conveyed to the receiver through the mobile terminal CT of the receiver, the call-receiving error detecting unit 42 determines whether a call-receiving by the receiver has failed or not depending on whether the call-receiving error detecting unit 42 receives a call termination signal indicating that a connected state of the call has terminated or not. If the call-receiving error detecting unit 42 determines that the call-receiving has failed, the call-receiving error detecting unit 42 sends a signal indicating the failed call to an operator informing unit 41. On the other hand, when the call-receiving error detecting unit 42 determines that the call-receiving has been successful, the call-receiving error detecting unit 42 sends a call completion signal to the phone calling module 7. When the phone calling module 7 receives the call completion signal, the phone calling module 7 switches the connected state of the mobile terminal CT to an unconnected state (that is, disconnects the call).

Counting of the predetermined period of time described above is started when the call-receiving error detecting unit 42 receives a signal indicating that the receiver switches the state of the mobile terminal CT to a connected state. The call termination signal is sent when the receiver disconnects the mobile terminal CT from the connected state, or when the mobile terminal CT of the receiver goes out of a service area during a call.

Figure 7:
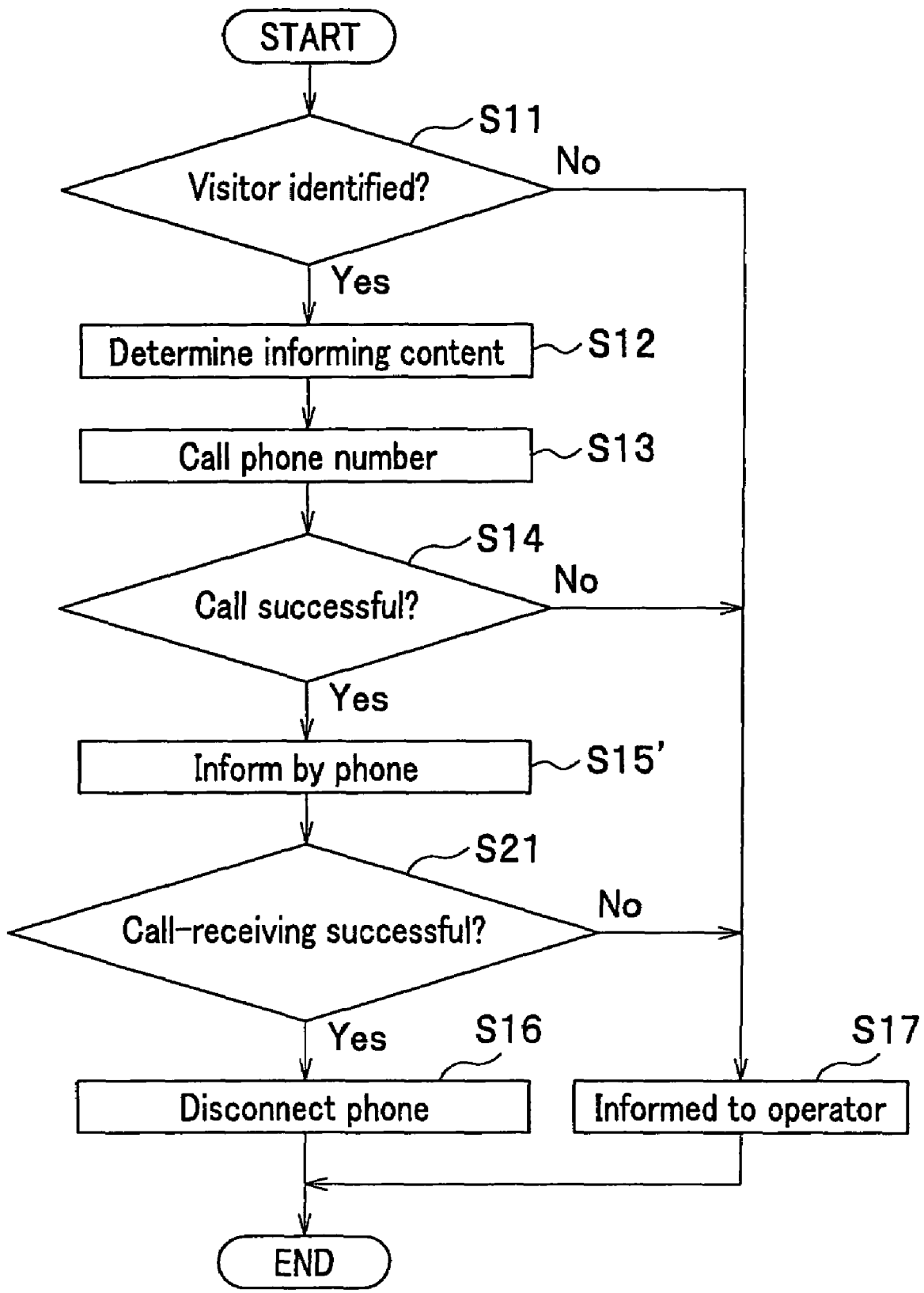
FIG. 7 is a flowchart showing a phone informing control according to the second embodiment.

Next is described a phone informing to the receiver using the reception system 1 according to the second embodiment with reference to the flowchart of FIG. 7. The phone informing according to this embodiment is the same as the phone informing control according to the first embodiment (see the flowchart of FIG. 5) except partial changes, so that the duplicate descriptions of steps S1 to S9, S11 to S14, S16 and S17, which are the same as those in the first embodiment, are omitted herefrom. A question to the visitor by the visitor information handling part 24, the speech generating part 23b, and the speaker 23 can be asked in any one of the steps S4 to S6. (S15') Phone informing step As shown in FIG. 7, in a phone informing step S15' according to the embodiment, an informing content is sent to the mobile terminal CT of the receiver as in the first embodiment, and reply data is also sent to the mobile terminal CT of the receiver. This enables the receiver to receive a combined content of "Mr./Ms. XX, XX (business title) of XX (company's name) has come. Please make a coffee." via the mobile terminal CT.

(S21) Call Termination Determining Step

In a call termination determining step S21, it is determined whether the call-receiving has been successful (terminated normally) or not, depending on whether the call-receiving error detecting unit 42 receives a call-receiving terminating signal or not, before a predetermined period of time elapses. If the call-receiving has failed (No), the process advances to the step S17, and the operator is informed of the failed call-receiving. On the other hand, if the call-receiving has been terminated successfully (Yes), the process advances to the phone disconnecting step S16, and the phone is disconnected.

With the aforementioned steps, the second embodiment has advantages as follows.

The reply data of "a coffee" in response to the question "What would you like to drink?" asked to the visitor by the robot 2 is informed to the receiver by phone, so that the receiver can quickly prepare a drink of the visitor's choice.

When a call error occurs that a call-receiving by the receiver has not terminated normally, the operator informing unit 41 can inform the operator of the call-receiving error, so that the operator can deal with the error appropriately.

The present invention can be carried out in various embodiments without being limited to the second embodiment.

In the second embodiment, the speaker 23a and the like are used as the informing unit, however, the present invention is not limited to this configuration. The informing unit may be a unit of visually informing a visitor of a question, such as a monitor and a touch panel.

In the second embodiment, a microphone and the like are used as the reply recognition unit, however, the present invention is not limited to this configuration. The reply recognition unit may be a unit of selecting a reply with an operation by the visitor such as a button and a touch panel.

In the second embodiment, the content of a question is assumed to be a kind of a drink of the visitor's choice, however, the present invention is not limited to this configuration. The content of a question may be the number of drinks, with or without milk and/or sugar, with or without an ashtray, or the like.

Third Embodiment

Figure 8:
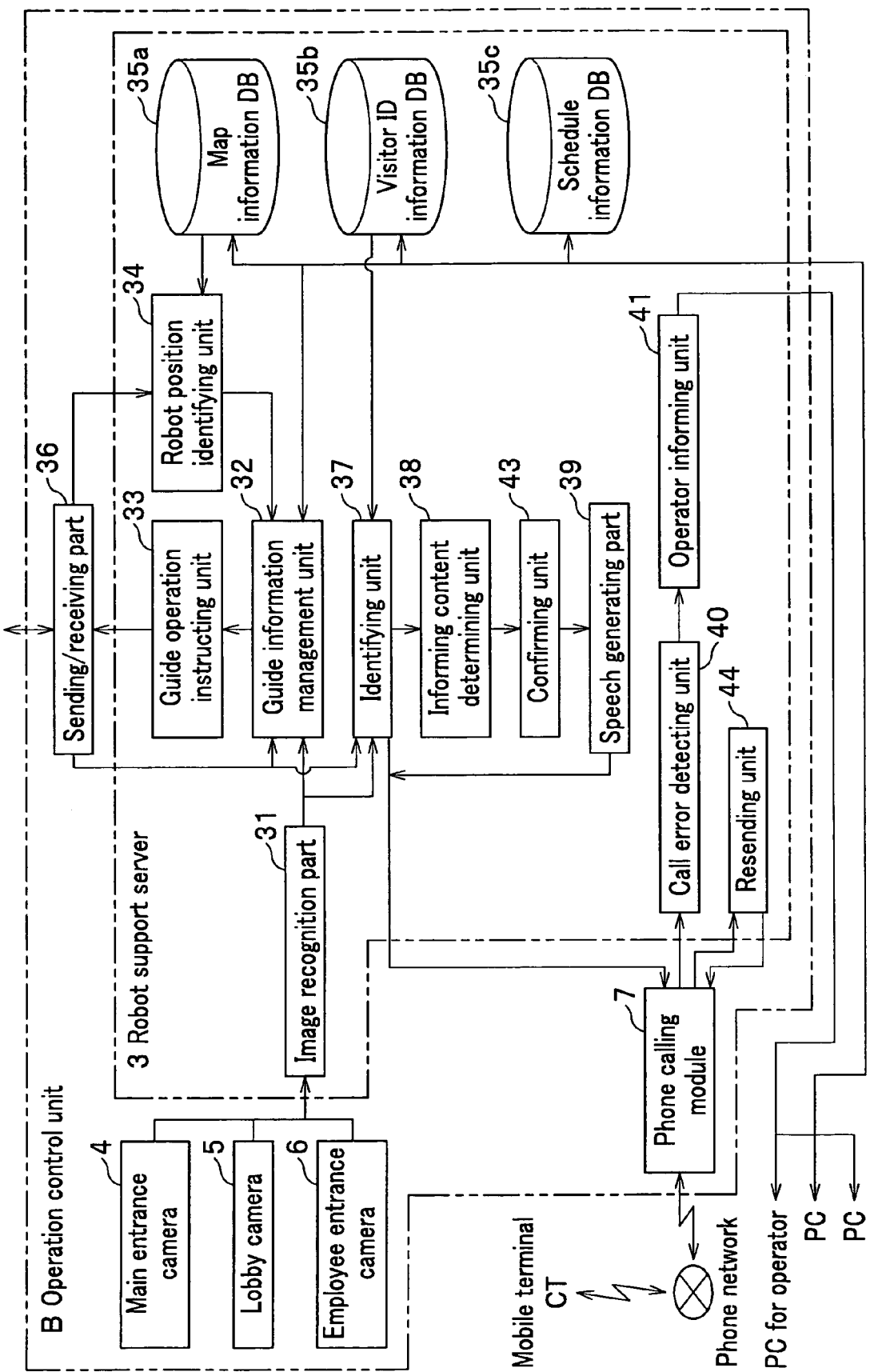
FIG. 8 is a block diagram showing an operation control unit of a reception system according to a third embodiment.

Next is described a third embodiment of the reception system according to the present invention. A configuration of this embodiment is the same as that of the first embodiment except partial changes, so that the same reference numerals are assigned to the same components as those in the first embodiment, and duplicate descriptions are omitted herefrom. FIG. 8 to be referred to herein is a block diagram showing an operation control unit of the reception system according to the third embodiment.

As shown in FIG. 8, a robot support server 3 according to the third embodiment is the same as that according to the first embodiment, except that the robot support server 3 according to the third embodiment is further provided with a confirming unit 43 and a resending unit 44.

The confirming unit 43 is provided between the informing content determining unit 38 and the speech generating part 39 each according to the first embodiment. The confirming unit 43 adds confirming information to an informing content sent from the informing content determining unit 38, and sends the both information to the mobile terminal CT of the receiver via the speech generating part 39, the phone calling module 7 and a phone network. The "confirming information" herein is information used to ask the receiver whether the receiver confirms the informing content sent from the phone calling module 7 via the phone network to the mobile terminal CT of the receiver. In this embodiment, it is assumed that the confirming information is set to have a content of "If you have confirmed the content, press the push button 1. If you would like to confirm the content again, press the push button 2".

When the resending unit 44 receives a response signal (a push sound of 1 or 2) sent from the visitor via the mobile terminal CT, the phone network, and the phone calling module 7 in response to the confirming information described above, the resending unit 44 determines whether the visitor has confirmed the informing content or not, based on the response signal. If the resending unit 44 determines that the receiver has confirmed the informing content, the resending unit 44 sends a call completion signal to the phone calling module 7, and makes the phone calling module 7 terminate the call. If the resending unit 44 determines that the receiver has not yet confirmed the informing content, the resending unit 44 sends a predetermined resending instruction signal to the phone calling module 7, and makes the phone calling module 7 resend the informing content and the confirming information.

Figure 9:
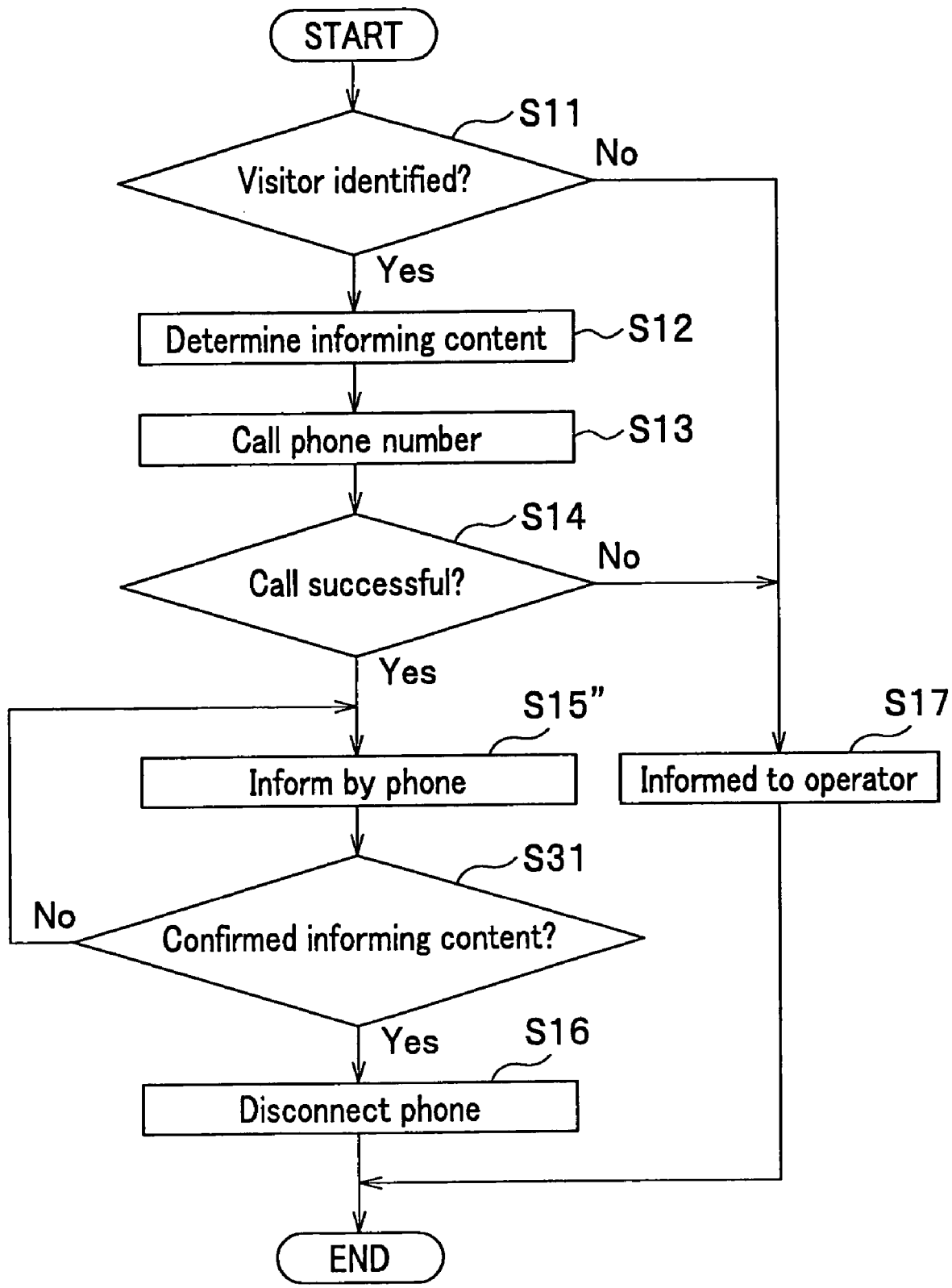
FIG. 9 is a flowchart showing a phone informing control according to the third embodiment.

Next is described a phone informing to the receiver using the reception system 1 according to the third embodiment with reference to the flowchart of FIG. 9. The phone informing according to this embodiment is the same as the phone informing control according to the first embodiment (see the flowchart of FIG. 5) except partial changes, so that the duplicate descriptions of steps S1 to S9, S11 to S14, S16 and S17, which are the same as those in the first embodiment are omitted herefrom.

(S15") Phone Informing Step

As shown in FIG. 9, in a phone informing step S15" according to this embodiment, an informing content is sent to the mobile terminal CT of the receiver as in the first embodiment, and the confirmation information is also sent to the mobile terminal CT of the receiver. This enables the receiver to receive the combined content of "Mr./Ms. XX, XX (business title) of XX (company's name) has come. If you have confirmed the content, press the push button 1. If you would like to confirm the content again, press the push button 2" via the mobile terminal CT.

(S31) Informing Content Confirming Step

In an informing content confirming step S31, it is determined whether the receiver confirms the informing content or not, based on the reply signal from the receiver. If the reply signal from the receiver is "2", it is determined that the receiver has not yet confirmed the informing content (No), the process returns to the phone informing step S15", and the informing content and the confirming information are resent to the receiver in phone informing step S15". On the other hand, if the reply signal from the receiver is "1", it is determined that the receiver has confirmed the informing content (Yes), the process advances to the step S16, and the call is disconnected.

With the aforementioned steps, the third embodiment has advantages as follows.

Even when the informing content is not successfully conveyed to the reception system 1 does not simply disconnect the call, but the resending unit 44 resends the informing content or the like, which enables the receiver to surely understand and confirm the informing content.

The present invention can be carried out in various embodiments without being limited to the third embodiment.

In the third embodiment, the informing content is added to the confirming information, however, the present invention is not limited to this configuration. The confirming information can be added to a reply made in the second embodiment. With this configuration, confirming information is added to a reply, for example, of "Please make a coffee.", which enables the receiver to serve a drink of the visitor's choice without fail.

The present invention can be carried out in various embodiments without being limited to the aforementioned embodiments.

The design of the robot 2 in the aforementioned embodiments can be changed according to the necessity. For example, the robot 2 is configured to have a plurality of wheels as an autonomous moving unit.

As the detecting unit of a visitor, one unit of the main entrance camera 4 and one unit of the lobby camera 5 are provided in the aforementioned embodiments, however, the present invention is not limited to this configuration. The numbers, functions and locations of the cameras in the aforementioned embodiments can be changed according to the necessity.

In the aforementioned embodiments, a moving body first detected by the main entrance camera 4 is recognized as a visitor, while detected by the employee entrance camera 6 is recognized as an employee, to thereby distinguish a visitor from an employee. However, the present invention is not limited to this configuration. For example, an employee may put on a uniform, a pair of shoes, or an employee's ID card to indicate his/her status as an employee. It can be thus determined whether a moving body captured by the lobby camera 5 is a visitor or an employee.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. A reception system comprising:
   an autonomously operating robot; and
   an operation control unit for controlling operations of the robot,
   wherein the robot or the operation control unit comprises:
   a detecting unit for detecting a visitor and obtaining information on the visitor;
   a storage unit for storing at least visitor related information including visitor comparison information prepared in advance which is to be compared with the visitor information obtained by the detecting unit, and a phone number of a receiver to receive the visitor;
   an identifying unit for identifying the visitor, based on a comparison between the visitor information obtained by the detecting unit and the visitor comparison information stored in the storage unit;
   a phone calling unit for making a call via a phone network to a phone of the receiver using the phone number included in the visitor related information, when the identifying unit identifies the visitor; and
   an informing content determining unit for determining an informing content to be informed to the receiver based on the visitor related information, when the identifying unit identifies the visitor,
   the informing content determined by the informing content determining unit to be transmitted via the phone network to the phone of the receiver, which is confirmed to be connected according to a call by the phone calling unit.

2. The reception system according to claim 1, further comprising a voice synthesizing unit,
   wherein both the voice synthesizing unit and the phone calling unit are provided in the operation controlling unit.

3. The reception system according to claim 2,
   wherein the robot or the operation control unit further comprises:
   a question content storage unit for storing therein a content of a question to be asked to the visitor,
   wherein the robot further comprises:
   a informing unit for informing the visitor of the question content stored in the question content storage unit; and
   a reply recognition unit for recognizing a reply from the visitor in response to the question content, and
   wherein the reply recognized by the reply recognition unit is sent to the receiver via the phone network and the phone.

4. The reception system according to claim 3,
   wherein the error signal is a call-receiving error signal indicating that the phone of the receiver is busy, powered off, or out of a service area.

5. The reception system according to claim 3,
   wherein the error signal is an unmatched signal indicating that the phone number called by the phone calling unit is different from the phone number of the receiver.

6. The reception system according to claim 5,
   wherein, after the call error detecting unit determines that the call has failed, the call error detecting unit determines whether the number of the failed calls is less than a predetermined number or not; if the call error detecting unit determines that the number of the failed calls is less than the predetermined number, the call error detecting unit makes the phone calling unit retry a call; and, if the call error detecting unit determines that the number of the failed calls is not less than the predetermined number, the call error detecting unit outputs the error informing signal to the operator informing unit.

7. The reception system according to claim 3,
   wherein, after the call error detecting unit determines that the call has failed, the call error detecting unit determines whether the number of the failed calls is less than a predetermined number or not; if the call error detecting unit determines that the number of the failed calls is less than the predetermined number, the call error detecting unit makes the phone calling unit retry a call; and, if the call error detecting unit determines that the number of the failed calls is not less than the predetermined number, the call error detecting unit outputs the error informing signal to the operator informing unit.

8. The reception system according to claim 7,
   wherein the robot or the operation control unit further comprises:
   a confirming unit for sending confirming information together with the transmitted information, to the receiver via the voice synthesizing unit, the phone network, and the phone, the confirming information asking the receiver whether or not the receiver has confirmed the transmitted information; and
   a resending unit for determining whether the receiver has confirmed the transmitted information or not based on a reply signal replied by the receiver in response to the confirming information, for terminating a connected state of the phone when the receiver is determined to have confirmed the transmitted information, and for resending the transmitted information and the confirming information when the receiver is determined not to have confirmed the transmitted information.

9. The reception system according to claim 2,
   wherein either the robot or the operation control unit further comprises:
   a call-receiving error detecting unit for determining whether a call-receiving by the receiver has failed or not by determining whether a call-receiving termination signal indicating that a state of the call-receiving has terminated is received or not, before a transmission time elapses which is necessary for transmitted information to be conveyed to the receiver via the voice synthesizing unit, the phone network, and the phone, and for outputting an error informing signal when the call is determined to have failed; and
   an operator informing unit for informing an operator that a call-receiving has failed when the call-receiving error detecting unit determines the call-receiving has failed.

10. The reception system according to claim 2,
    wherein the robot or the operation control unit further comprises:
    a confirming unit for sending confirming information together with the transmitted information, to the receiver via the voice synthesizing unit, the phone network, and the phone, the confirming information asking the receiver whether or not the receiver has confirmed the transmitted information; and
    a resending unit for determining whether the receiver has confirmed the transmitted information or not based on a reply signal replied by the receiver in response to the confirming information, for terminating a connected state of the phone when the receiver is determined to have confirmed the transmitted information, and for resending the transmitted information and the confirming information when the receiver is determined not to have confirmed the transmitted information.

11. The reception system according to claim 1,
wherein either the robot or the operation control unit further comprises:
a question content storage unit for storing therein a content of a question to be asked to the visitor,
wherein the robot further comprises:
an informing unit for informing the visitor of the question content stored in the question content storage unit; and
a reply recognition unit for recognizing a reply from the visitor in response to the question content, and
wherein the reply recognized by the reply recognition unit is sent to the receiver via the phone network and the phone.

12. The reception system according to claim 11,
wherein the robot or the operation control unit further comprises:
a call-receiving error detecting unit for determining whether a call-receiving by the receiver has failed or not by determining whether a call-receiving termination signal indicating that a state of the call-receiving has terminated is received or not, before a transmission time elapses which is necessary for transmitted information to be conveyed to the receiver via the voice synthesizing unit, the phone network, and the phone, and for outputting an error informing signal when the call is determined to have failed; and
an operator informing unit for informing an operator that a call-receiving has failed, if the call-receiving error detecting unit determines the call-receiving has failed.

13. The reception system according to claim 11,
wherein the robot or the operation control unit further comprises:
a confirming unit for sending confirming information together with the transmitted information, to the receiver via the voice synthesizing unit, the phone network, and the phone, the confirming information asking the receiver whether or not the receiver has confirmed the transmitted information; and
a resending unit for determining whether the receiver has confirmed the transmitted information or not based on a reply signal replied by the receiver in response to the confirming information, for terminating a connected state of the phone when the receiver is determined to have confirmed the transmitted information, and for resending the transmitted information and the confirming information when the receiver is determined not to have confirmed the transmitted information.

14. The reception system according to claim 1,
wherein either the robot or the operation control unit further comprises:
a call error detecting unit for determining whether a call made by the phone calling unit has failed or not based on whether the call error detecting unit receives a predetermined error signal or not, and for outputting an error informing signal when the call is determined to have failed; and
an operator informing unit for informing an operator of the failed call based on the error informing signal.

15. The reception system according to claim 1,
wherein either the robot or the operation control unit further comprises:
a call error detecting unit for determining that a call made by the phone calling unit has failed, if a predetermined period of time elapses after the phone calling unit makes a call, and for outputting an error informing signal, if the call is determined to have failed; and
an operator informing unit for informing an operator of the failed call based on the error informing signal.

* * * * *